(12) United States Patent
Bowen et al.

(10) Patent No.: US 9,304,264 B2
(45) Date of Patent: Apr. 5, 2016

(54) OPTICAL FIBER SUBASSEMBLY

(71) Applicant: Tyco Electronics Corporation, Berwyn, PA (US)

(72) Inventors: Terry Patrick Bowen, Dillsburg, PA (US); Thomas Paul Huegerich, Manchester Center, VT (US); Jibin Sun, San Mateo, CA (US); Frances T. Peralta, E. Palo Alto, CA (US); Aleksandar K. Angelov, Harrisburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 183 days.

(21) Appl. No.: 13/871,571

(22) Filed: Apr. 26, 2013

(65) Prior Publication Data

US 2014/0321809 A1 Oct. 30, 2014

(51) Int. Cl.
*G02B 6/36* (2006.01)
*G02B 6/38* (2006.01)

(52) U.S. Cl.
CPC ............ *G02B 6/3881* (2013.01); *G02B 6/3636* (2013.01); *G02B 6/3853* (2013.01); *G02B 6/3858* (2013.01); *G02B 6/3885* (2013.01)

(58) Field of Classification Search
None
See application file for complete search history.

(56) References Cited

U.S. PATENT DOCUMENTS

| | | | | |
|---|---|---|---|---|
| 4,830,456 A | * | 5/1989 | Kakii et al. | 385/75 |
| 4,973,127 A | * | 11/1990 | Cannon et al. | 385/56 |
| 5,359,687 A | | 10/1994 | McFarland et al. | |
| 5,664,039 A | * | 9/1997 | Grinderslev et al. | 385/65 |
| 2002/0141725 A1 | * | 10/2002 | Harr et al. | 385/137 |
| 2003/0175000 A1 | * | 9/2003 | Caracci et al. | 385/137 |
| 2004/0005111 A1 | | 1/2004 | Ishikawa et al. | |
| 2004/0086255 A1 | * | 5/2004 | Botet et al. | 385/137 |
| 2004/0120682 A1 | | 6/2004 | Bhagavatula et al. | |
| 2004/0165829 A1 | * | 8/2004 | Botet et al. | 385/49 |
| 2010/0284651 A1 | * | 11/2010 | Krahenbuhl et al. | 385/35 |
| 2012/0257860 A1 | | 10/2012 | Li et al. | |

FOREIGN PATENT DOCUMENTS

| | | | | | |
|---|---|---|---|---|---|
| JP | 4-98204 A | * | 3/1992 | | G02B 6/32 |
| JP | 2007-41222 A | * | 2/2007 | | G02B 6/32 |

OTHER PUBLICATIONS

International Search Report, International Application No. PCT/US2014/035382, International Filing Date Apr. 25, 2014.

* cited by examiner

*Primary Examiner* — Mike Stahl

(57) ABSTRACT

An interposer sub-assembly for holding or gripping a plurality of optical fibers in a multi-fiber ferrule connector including: a substrate comprising a bottom surface, a top surface, and a front face; a pair of guide pin grooves on the bottom surface of said substrate, wherein the pair of guide pin grooves are capable of receiving guide pins from a ferrule connector; and a plurality of resilient fiber grooves formed on the bottom surface, wherein the plurality of resilient fiber grooves are configured for receiving a plurality of optical conduits.

14 Claims, 7 Drawing Sheets

OPTICAL FIBER SUBASSEMBLY

FIELD OF THE INVENTION

The present invention generally relates to optical fiber handling. More particularly, the present invention relates to gripping elements which can be used to position optical fibers and lenses in an array, optical waveguide devices and methods for manufacturing optical fiber and lens arrays and optical waveguide devices.

BACKGROUND OF THE INVENTION

Optical fibers have been widely used in optical communications for propagating light over long distances. Light propagates through the core region of optical fibers and these core regions can be as small as a few microns in diameter. Although the fibers can be fabricated in lengths of many kilometers, multiple optical fibers must be joined together or coupled for transmission across greater distances. One critical consideration during coupling is accurate alignment of fibers to avoid loss of light transmitted through the coupling.

Further, as optical devices continue to shrink, and integration of multiple devices on a single chip becomes more popular, fiber positioning elements become more valuable. Many photonic applications require precision alignment of one- and two-dimensional arrays of optical fibers to optical elements that emit or receive light. Examples of such optical elements include, but are not limited to, lenses, detectors, laser sources and other optical fibers. Particular examples of applications that require precision alignment of arrays of optical fibers to optical elements include two-dimensional fiber array connectors in optical data or communication applications, two-dimensional fiber-lens arrays for three-dimensional optical cross connection switches, and two dimensional fiber-detector arrays for broadcast and network interconnection schemes.

A challenge in assembly of two-dimensional optical element arrays is precision positioning of each fiber during alignment and attachment processes. Typical multimode applications require each fiber to be placed on a two-dimensional array with a positional accuracy of less than 5 microns. Typical single-mode fiber alignment applications (to other fibers or optical elements such as lenses or laser sources) require lateral positional accuracy of less than 1-2 microns, while other applications require sub-micron positional accuracy.

Many devices and methods have been provided for positioning fibers in two-dimensional arrays, including etched silicon alignment structures, alignment blocks with holes to guide fibers, and stacked structures that form fiber guides. In each of these devices and methods, the alignment structures provide relatively "hard" and inflexible surfaces for fiber alignment, leading to small misalignments in cases where the physical size of the optical element varies slightly from element to element across the array.

Numerous articles and methods have been devised in the prior art to provide planar fiber positioning elements which allow for efficient coupling of optical fibers to substrates. However, the need for critical alignment tolerances has resulted in a high degree of complexity and cost for these devices. Further, the need for critical alignment tolerances has resulted in precision devices that are difficult to manufacture in an automated manner. One such device is a multi-fiber ferrule connector, such as a MT-type ferrule connector, as shown in FIGS. 1 and 2. MT-type ferrules are expensive, difficult to manufacture and, during assembly, require the optical fibers to be threaded through small bore holes with extremely tight tolerances. Threading fibers into bores with such tight tolerances is difficult to automate.

Consequently, a need exists for a sub-assembly for simplifying the fiber presentation that maintains accurate positioning of the fibers in an array, and enables automated assembly.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides a sub-assembly for simplifying the fiber presentation and positioning of optical conduits, such as optical fibers or waveguides, in an array, and enables automated assembly by exploiting the alignment pins used in common connector and interposer interfaces. In one embodiment, the sub-assembly provides a multi-fiber array sub-assembly that uses resilient fiber grooves to hold and position the fibers. One or more of these sub-assemblies can mate to existing MT-type ferrules or to interposer interfaces having alignment guide pins/holes. Embodiments of the present invention can be used in combination with over-molding to form standard MT ferrule configurations. Over-molding can be accomplished by using standard processes such as, for example, injection molding, flip-chip like encapsulation, or a combination thereof.

Accordingly, the present invention relates to an interposer sub-assembly comprising: a substrate comprising a bottom surface, a top surface, and a front face; a pair of guide pin grooves on the bottom surface of said substrate, wherein the pair of guide pin grooves are capable of receiving guide pins from a ferrule connector; and a plurality of resilient fiber grooves formed on the bottom surface, wherein the plurality of resilient fiber grooves are configured for receiving a plurality of optical conduits. More particularly, the pair of guide pin grooves are V-shaped for receiving and locating at least a portion of the guide pins from the ferrule connector. A centerline through each groove of the pairs of guide pin grooves is aligned with a centerline of the corresponding receiving guide pins. In one embodiment, a distance between the centerlines through the pairs of guide pin grooves corresponds to a spacing between the receiving guide pins of a MT-type ferrule connector. The optical conduit can be an optical fiber or a waveguide. In one embodiment, the pair of guide pin grooves are capable of receiving guide pins of MT-type ferrule connector.

In embodiments where the optical conduits are waveguides, the interposer sub-assembly further comprises a polymer cladding encapsulating the plurality of waveguides. In one embodiment, the plurality of waveguides are formed on an oxide layer on the substrate. The plurality of waveguides can be formed using $Si_3N_4$. The sub-assembly can further include an over-mold encapsulating the sub-assembly to form a ferrule connector.

Some embodiment of the present invention further comprises a glass cover positioned on top of the plurality of resilient fiber grooves, wherein the glass cover secures the plurality of optical conduits received in the plurality of resilient fiber grooves. The plurality of resilient fiber grooves can be formed by a plurality of fiber grippers. In one embodiment, each resilient fiber groove is configured to receive an optical fiber having an outer-diameter of about 80 microns. In another embodiment, each resilient fiber groove is configured to receive an optical fiber having an outer-diameter of about 125 microns. Embodiments of the sub-assembly comprising the plurality of resilient fiber grooves receiving the plurality of optical conduits facilitate alignment of the plurality of optical conduits received with the receiving guide pins. In one embodiment, a centerline through each optical conduit received in the plurality of resilient fiber grooves aligns with a centerline of the receiving guide pins. In another embodiment, a centerline through each optical conduit received in the plurality of resilient fiber grooves is offset from a centerline of the receiving guide pins.

Other embodiments of the present invention further comprises a plate located on the front face of the substrate, wherein the plate comprises a plurality of lenses arranged to form a lens array, wherein the lenses are fabricated on the plate, and wherein the lenses arranged to form the lens array align with the plurality of optical fibers when received in the plurality of resilient fiber grooves.

Embodiments in accordance with the present invention can further include an over-mold encapsulating the sub-assembly to form a ferrule connector.

Another aspect of the present invention relates to an interposer comprising: a sub-assembly comprising: a substrate comprising a bottom surface, a top surface, and a front face; a pair of guide pin grooves on the bottom surface of said substrate, wherein the pair of guide pin grooves are capable of receiving guide pins from a ferrule connector; a plurality of fiber grippers formed on the bottom surface, wherein the plurality of fiber grippers are arranged on the bottom surface to form a plurality of resilient fiber grooves for receiving a plurality of optical fibers; and an over-mold encapsulating the sub-assembly to form the interposer.

Yet another aspect of the present invention relates to an interposer sub-assembly comprising: a substrate comprising a bottom surface, a top surface, and a front face; a pair of guide pin grooves on the bottom surface of said substrate, wherein the pair of guide pin grooves are capable of receiving guide pins from a ferrule connector; a plurality of fiber grippers formed on the bottom surface, wherein the plurality of fiber grippers are arranged on the bottom surface to form a plurality of resilient fiber grooves for receiving a plurality of optical fibers; and a lens plate located on the front face of the substrate, wherein the lens plate comprises a plurality of lenses arranged to form a lens array, wherein the lenses are fabricated on the glass surface, and wherein the lenses arranged to form the lens array align with the plurality of optical fibers when received in the plurality of resilient fiber grooves.

DETAILED DESCRIPTION

Figure 3:
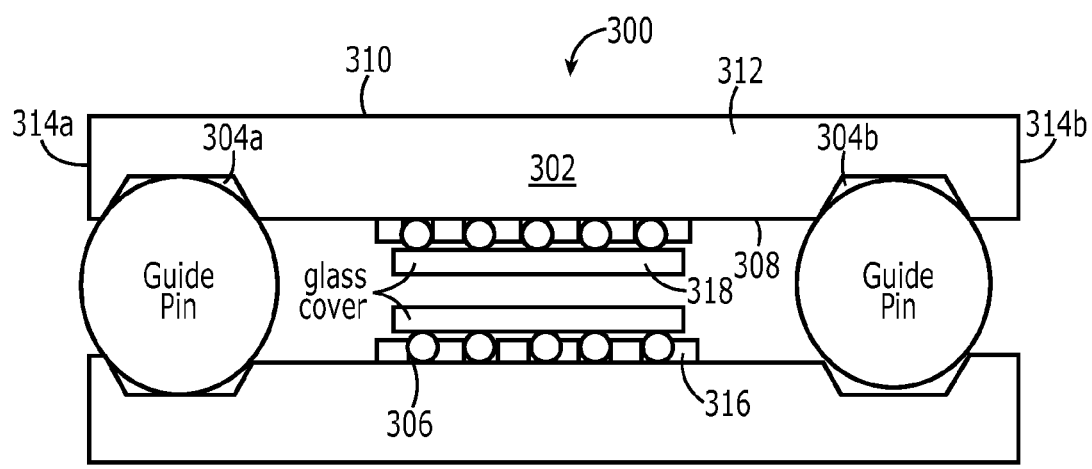
FIG. 3 is perspective view of an interposer sub-assembly in accordance with an embodiment of the present invention.

Referring now to the drawings, and more particularly, to FIG. 3, there is shown an interposer sub-assembly for holding (or gripping) and aligning a plurality of optical conduits in a multi-fiber ferrule connector, generally designated 300, which comprises or incorporates the embodiments of the present invention. Sub-assembly 300 includes at least one substrate 302, guide pin grooves 304a and 304b, and resilient fiber grooves 306.

Substrate 302 includes a bottom surface 308, top surface 310, front face 312, and side surfaces 314a-b. In some embodiments of the present invention, width of substrate 302 is slightly less than the width of a receiving ferrule connector to ensure sub-assembly 300 can be inserted into the receiving ferrule connector housing. Substrates 302 can be fabricated from a variety of suitable materials. Suitable materials for substrates 302 include, but are not limited to, rigid low-expansion glass, ceramic, metallic material, semiconductor substrates, silicon wafers, as well as both filled and unfilled polymeric systems.

Guide pin grooves 304a-b are formed on bottom surface 308 of substrate 302 and extend from front face 312 to rear end of sub-assembly 300. Guide pin grooves 304a-b on substrate 302 are positioned to receive guide pins of the receiving ferrule connector. Each guide pin groove 304a-b has side walls that taper toward the bottom wall of each groove to form a V-shaped trench for accommodating at least a portion of receiving guide pin.

Figure 1A:
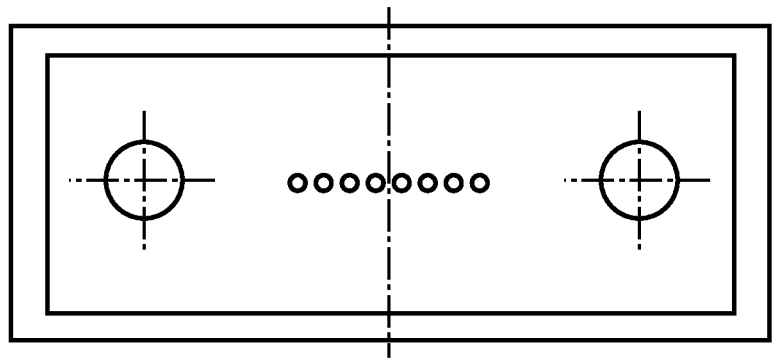
FIG. 1 is perspective view of a prior art MT-type multi-fiber ferrule showing fiber positions in multi-fiber arrays.
Figure 1B:
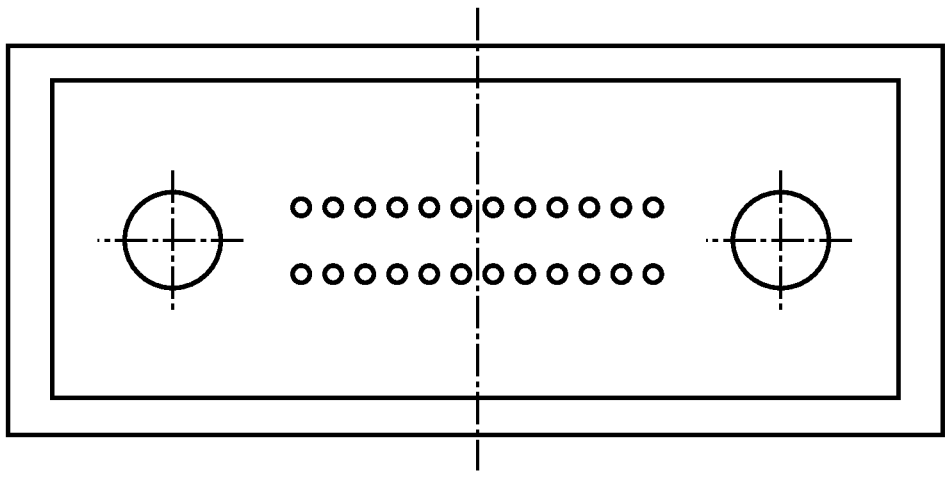
Figure 2:
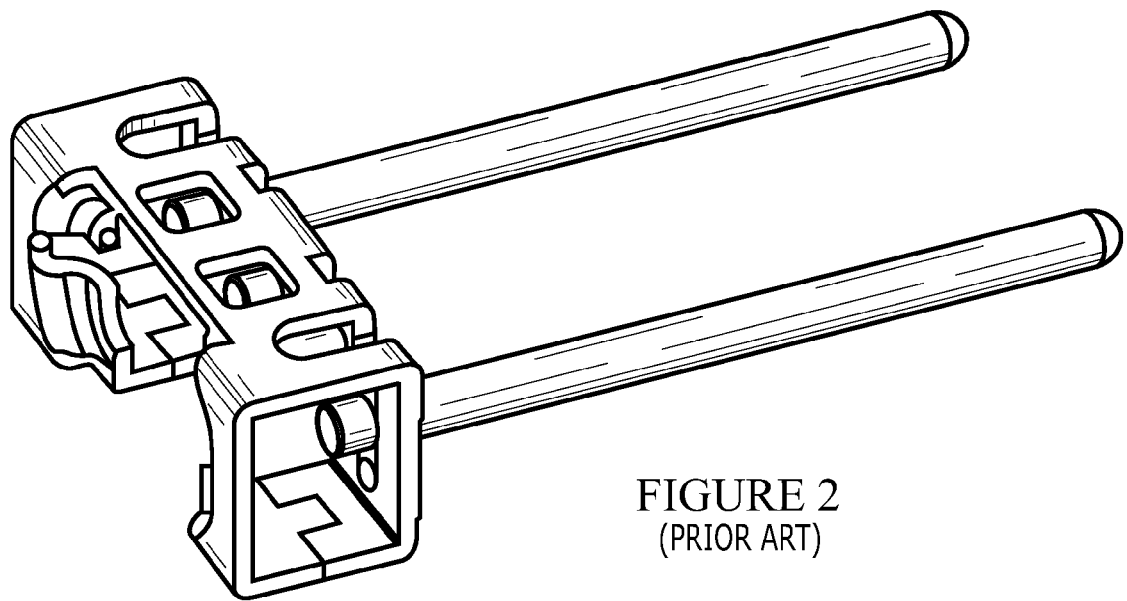
FIG. 2 is perspective view of a prior art MT-type multi-fiber ferrule connector component showing guide pins in a holder.

Dimensions of each groove of guide pin grooves 304a-b allow for receiving at least a portion of a guide pin of a ferrule connector. In one embodiment of the present invention, dimensions of each groove of guide pin grooves 304a-b allow for receiving guide pins of a MT-type ferrule connector shown in FIG. 2. Width of each groove of guide pin grooves 304a-b along bottom surface 308 in combination with angle formed by the side wall with bottom surfaces 308 determines the depth of each groove of guide pin grooves 304a-b. Width of each groove of guide pin grooves 304a-b along bottom surface 308 in combination with angle formed by the side wall with bottom surface 308 also determines the height along centerline of the corresponding guide pin each groove can accommodate. In one embodiment of the present invention, angle formed by side wall of each groove of guide pin grooves 304a-b with bottom surface 308 is about 54.7 degrees, which is the angle of the crystalline plane of silicon.

In the embodiment of FIG. 3, when guide pins are received in guide pin grooves 304a-b, a centerline through each groove of guide pin grooves 304a-b aligns with a centerline of the corresponding guide pin received. Distance between a centerline through guide pin grooves 304a and a centerline through guide pin grooves 304b corresponds to the spacing between the centers of receiving guide pins. In one embodiment of the present invention, distance between a centerline through guide pin grooves 304a and a centerline through guide pin grooves 304b corresponds to the spacing between the centers of receiving guide pins of MT-type ferrule connector.

Guide pin grooves 304a-b can be fabricated via a number of methods, including but not limited to stamping, photolithography, photo lithographically-defined wet or dry chemical etching, or molding. In one embodiment of the present invention, guide pin grooves 304a-b are fabricated using wet etching of crystalline silicon wafers.

In the embodiment of FIG. 3, sub-assembly 300 further includes a plurality of resilient fiber grooves 306 capable of receiving optical conduits. As used herein, the term "groove" refers to, in general, any shaped opening extending from front face 312 partially or fully through rear end of substrate 302. In one embodiment of the present invention, the optical conduit is an optical fiber. In another embodiment of the present invention, the optical conduit is a waveguide. Resilient fiber grooves 306 facilitate alignment of centers of optical conduits received with centers of corresponding optical conduits of a complementary mating assembly. In one embodiment of the present invention, resilient fiber grooves 306 located on bottom surface 308 facilitate alignment of fibers received with the fibers, having same or equal outer-diameter, of a complementary mating assembly. In another embodiment of the present invention, resilient fiber grooves 306 located on bottom surface 308 facilitate alignment of fibers received with the fibers, having larger outer-diameter, of a complementary mating assembly.

Resilient fiber grooves 306 are located on bottom surface 308 of substrate 302 to form a one-dimensional or a two-dimensional array of resilient fiber grooves 306 on a fixed or variable pitch. Resilient fiber grooves 306 are formed to have a width which is less than the outer-diameter dimension of the optical conduits received. This is to insure a press fit of the optical fibers into resilient fiber grooves 306. Tolerance of the width of resilient fiber grooves 306 and tolerance of the optical conduit outer diameter are in differing amounts of compression fit when pressing the fibers into the resilient fiber grooves. The optical conduits tend to be centered in the resilient fiber grooves 306. A centerline through the centers of the optical conduits received in resilient fiber grooves 306 located on bottom surface 308 aligns with, or is offset from, the centerline of the guide pins of a ferrule connector. In one embodiment of the present invention, resilient fiber grooves 306 located on bottom surface 308 offset centers of optical conduits received from centerline of the guide pins by about 250 microns for multi-row array. In another embodiment of the present invention, resilient fiber grooves 306 located on bottom surface 308 offset centers of optical conduits received from centerline of the guide pins by about 500 microns for multi-row array.

Resilient fiber grooves 306 in substrate 302 can be fabricated using a number of methods, including but not limited to photolithography deposition. In a conventional fabrication method, curable material, such as a curable polymer or monomer, can be deposited over bottom surface 308 of substrate 302 to form blocks or fiber grippers 316 having predefined height and width. Blocks 316 are set apart from each other with a spacing to form resilient fiber grooves 306.

Sub-assembly 300 can further include a fiber cover 318 for securing optical conduits received in resilient fiber grooves 306. During assembly, optical conduits can be presented into open resilient fiber grooves 306 from above in a downward motion. In some embodiments of the present invention, optical conduits received in resilient fiber grooves 306 are bonded into place with adhesive after presentation into the resilient fiber groove 306. Fiber cover 318 can then be used to press the optical conduits securely onto bottom surface 308 located at the base of resilient fiber grooves 306.

During assembly of embodiments using optical fibers as optical conduits, the optical fibers can be presented into an array of open resilient fiber grooves 306 from above in a downward motion. The end faces of the optical fibers protrude past front face 312 of substrate 302 with resilient fiber grooves 306. The fiber end faces can be laser cleaved with accurate positioning of substrate 302 using guide pin grooves 304a-b and an accurately positioned pair of guide pins, and front face 312 of substrate 302 as a physical stop surface.

Figure 4:
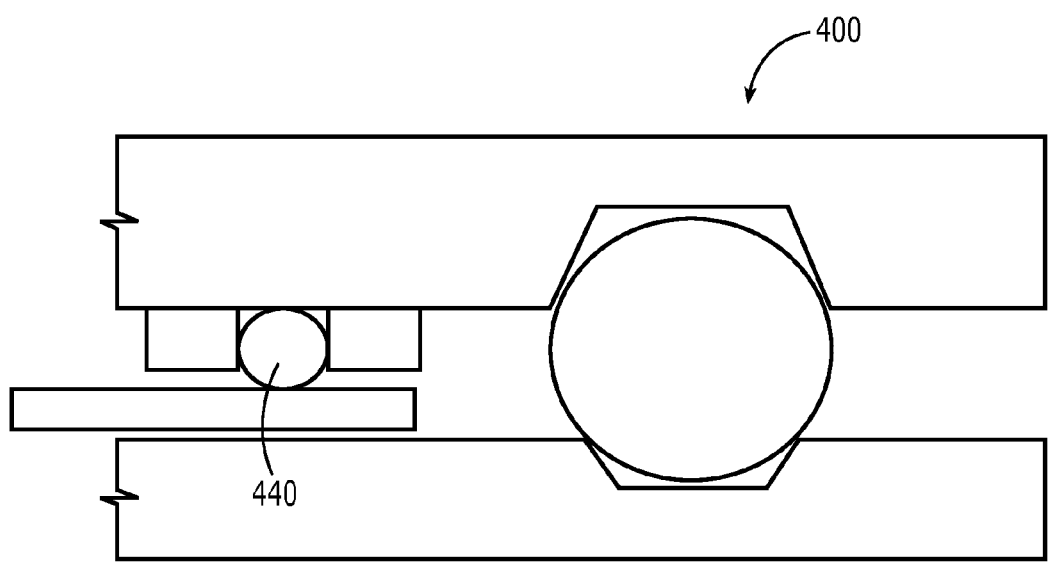
FIG. 4 is perspective view of an interposer sub-assembly in accordance with an alternate embodiment of the present invention.

Sub-assembly 300 in accordance with an embodiment of the present invention can be used to accommodate multiple optical fibers in multiple rows to form a multi-dimension array. In one embodiment of the present invention, sub-assembly 300 capable of accommodating 24 optical fibers in an array having 2 rows of 12 optical fibers with each fiber having an outer-diameter of about 125 μm. In another embodiment of the present invention, sub-assembly 300 capable of accommodating 24 optical fibers in an array having 2 rows of 12 optical fibers with each fiber having an outer-diameter of about 80 μm. In some embodiments of the present invention, sub-assembly 400 is capable of accommodating optical fibers 440 having an outer-diameter of about 80 μm or about 125 μm in a single row, as shown in FIG. 4.

Referring back to FIG. 3, optical conduits received in resilient fiber grooves 306 can be standard fibers, or fibers coupled with graded-index ("grin") fiber lenses to provide a beam expanded fiber interface. In one embodiment of the present invention, optical conduits received in resilient fiber grooves 306 can be optical fibers coupled with graded-index ("grin") fiber lenses to provide a beam expanded fiber interface.

Figure 5A:
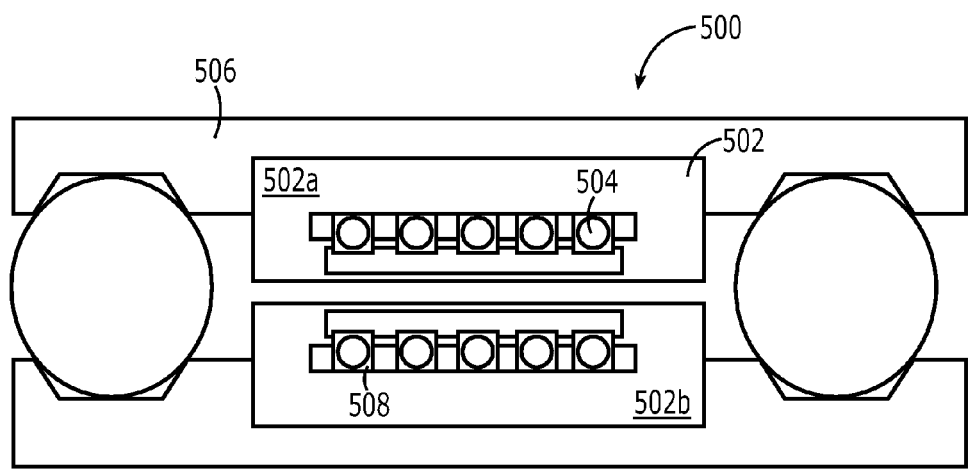
FIG. 5 is perspective view of alternate interposer sub-assemblies in accordance with an alternate embodiment of the present invention including lens plate with aligned lens arrays.
Figure 5B:
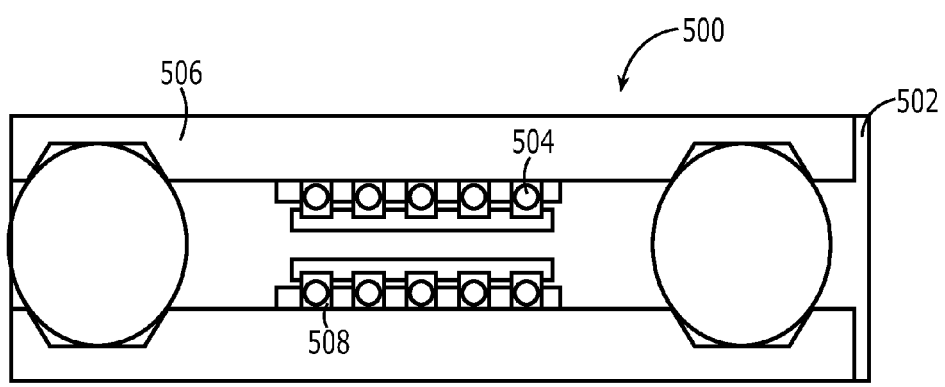

In some embodiments of the present invention, standard fibers can be used with an array lens with guide pin bores where the guide pins can be used to position the lens array accurately in front of the fiber sub-assembly array. In other embodiments of the present invention, an array of lenses can be assembled onto front face 312 of a silicon substrate, which includes grooves to align the lens array to guide pins, to form a lens array sub-assembly. FIG. 5 illustrates alternative embodiments of the present invention, wherein sub-assembly 500 further includes a lens plate 502 comprising lenses 504 fabricated onto the surface of lens plate 502 to form a lens array. Lens plate 502 is positioned in front of front face 506 to align each lens in lens array with corresponding optical conduits received in resilient fiber grooves 508 and form an expanded beam array interconnect. In some embodiments where sub-assembly 500 is combined with another similar sub-assembly to form a sandwich assembly, as shown in FIG. 5(a), two lens plates 502a and 502b are positioned in front of front face 506 to align each lens array with corresponding optical conduits received in resilient fiber grooves 508 and form an expanded beam array interconnect. In another embodiment where sub-assembly 500 is combined with another similar sub-assembly to form a sandwich assembly, as shown in FIG. 5(b), as single lens plate 502 is positioned in front of front face 506 to align each lens in lens array with corresponding optical conduits received in resilient fiber grooves 508 and form an expanded beam array interconnect. Lenses can be fabricated as an array on lens plate 502 using known photolithographic methods and, during manufacture of a sub-assembly in accordance with the present invention, lens plate 502 can be positioned and bonded on the sub-assembly using robotic methods.

Figure 6:
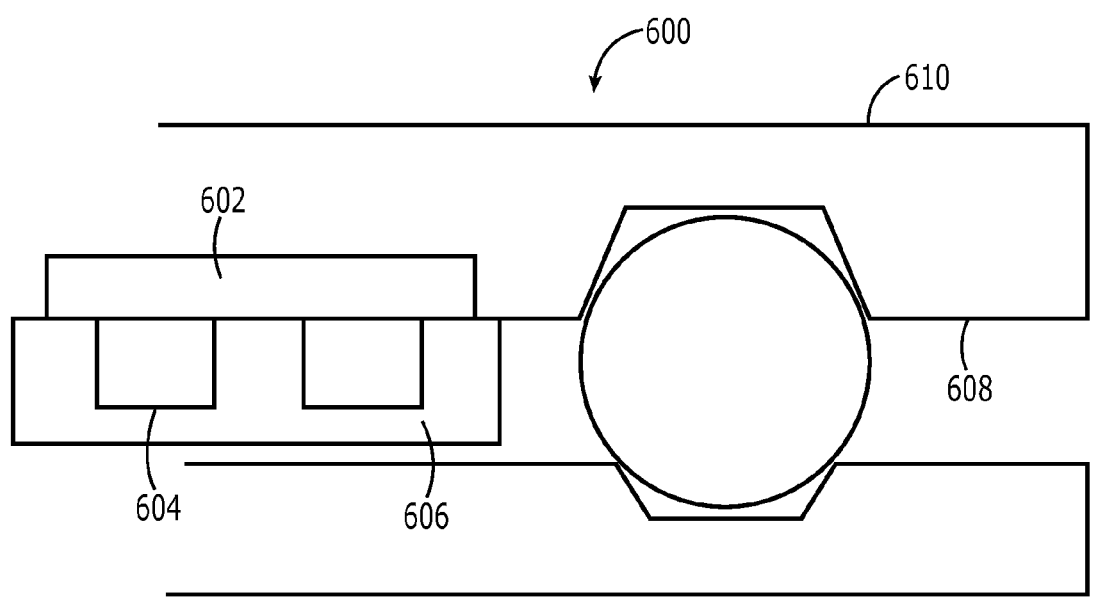
FIG. 6 is perspective view of an interposer sub-assembly in accordance with an alternate embodiment of the present invention including polymer waveguide cores.
Figure 7:
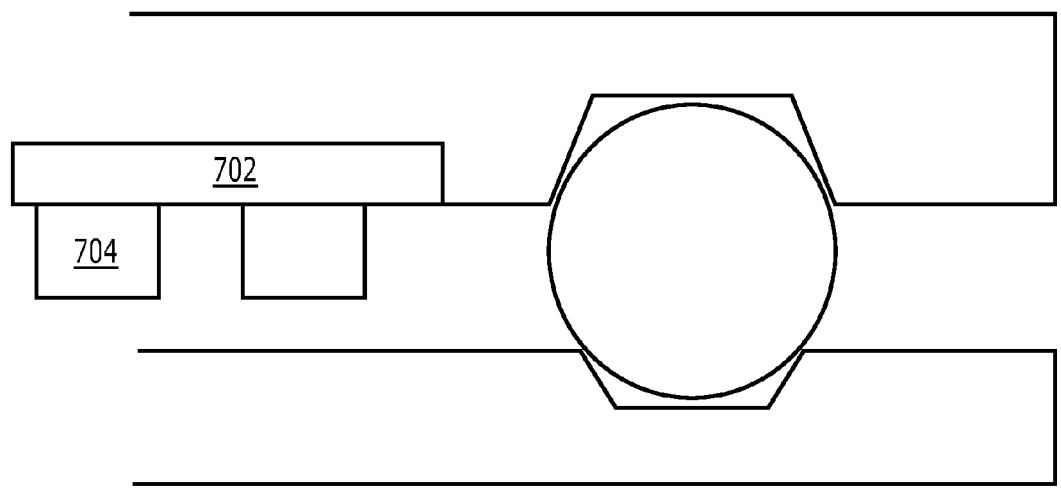
FIG. 7 is perspective view of an interposer sub-assembly in accordance with an alternate embodiment of the present invention including $Si_3N_4$ waveguide cores.

Although multi-fiber applications are shown and described herein, it should be appreciated that the invention is not limited to multi-fiber applications and is also applicable to ribbon fiber, planar waveguide arrays which are incorporated in Photonic Integrated Circuits (PICs) and waveguide ribbons as well. FIG. 6 illustrates an alternative sub-assembly 600 for holding a plurality of wave-guides in a ferrule connector, which comprises or incorporates the embodiments of the present invention. Sub-assembly 600 includes precursor lower clad layer 602, waveguide core 604, and polymer upper clad 606. Precursor lower clad layer 602 is grown on bottom surface 608 of substrate 610 using known methods. In one embodiment of the present invention, precursor lower clad layer 602 is a thermal oxide layer. Waveguide core 604 is formed on top of precursor layer 602 by applying a layer of polymer waveguide core precursor, which is turned into core material upon contact with a laser beam of sufficient energy. A top layer of polymer clad 606 is applied to encapsulate waveguide core 604. In some embodiments of the present invention, waveguide core can be made from a material comprising $Si_3N_4$. In embodiments where waveguide core 604 is made from materials comprising $Si_3N_4$, as shown in FIG. 7, a top layer of silica clad 702 is used to encapsulate waveguide core 704. Waveguide cores 604 are formed to have widths that allow for a predetermined spacing between a desired number of waveguide cores 604 on substrate 302. In one embodiment of the present invention, sub-assembly 600 is capable of accommodating one row of 12 polymer waveguide cores along the centerline joining the centers of the guide pins. In another embodiment of the present invention, sub-assembly 600 is capable of accommodating one row of 12 $Si_3N_4$ waveguide cores along the centerline joining the centers of the guide pins.

Embodiments in accordance with the present invention provides an interposer sub-assembly for simplifying the fiber presentation, maintaining accurate positioning of the fibers in an array, and enabling automated assembly. More particularly, the present invention provides a multi-fiber array sub-assemblies that can mate to existing MT-type ferrules with fibers installed. Embodiments of sub-assembly in accordance with the present invention can be inserted into a standard MT-type ferrule connector, or over-molded (or encapsulated) to form a ferrule connector. Over-molding can either be accomplished by using standard processes such as an injection molding or flip-chip like encapsulation or a combination of the two. Before over-molding, all surfaces of the inverted fiber array sub-unit such as the Si locator grooves, Si wafer surfaces, glass cover, polymer clad, resist etc. may be pre-treated with adhesion promoter. Exemplary materials that can be used for over-molding/encapsulation include thermoplastics, thermosets, liquid crystal polymers, epoxies, silicon and urethane polymers, and the like. The interposer sub-assembly in accordance with embodiments of the present invention also allows for economical and automated manufacturing. The interposer sub-assembly in accordance with embodiments of the present invention may be used to directly mate to Photonic Integrated Circuits (PICs) which present optical waveguide arrays for interface to either other optical waveguide arrays or to optical fibers.

It is thought that the interposer sub-assembly of the present invention and many of its attendant advantages will be understood from the foregoing description and it will be apparent that various changes may be made in the form, construction arrangement of parts thereof without departing from the spirit and scope of the invention or sacrificing all of its material advantages, the form hereinbefore described being merely a preferred or exemplary embodiment thereof.

What is claimed is:

1. A sub-assembly comprising:
    a substrate comprising a first surface, a second surface, and a front face, said substrate comprising a rigid material;
    a plurality of polymeric, resilient side walls deposited on the first surface to define one or more grooves in which the plurality of resilient side walls defines sides of the grooves and the first surface of the rigid substrate defines a bottom of the grooves, wherein each groove of the grooves is configured for receiving an optical fiber such that the optical fiber contacts the first surface when disposed in the groove; and
    a pair of guide pin grooves on the first surface of said substrate, wherein the pair of guide pin grooves is configured to receive guide pins from a ferrule connector.

2. The sub-assembly of claim 1, wherein the pair of guide pin grooves are V-shaped for receiving and locating at least a portion of the guide pins from the ferrule connector.

3. The sub-assembly of claim 1, wherein the pair of guide pin grooves is configured to receive guide pins of MT-type ferrule connector.

4. The sub-assembly of claim 1, wherein a centerline through each groove of the pair of guide pin grooves is aligned with a centerline of the guide pins.

5. The sub-assembly of claim 4, wherein a distance between the centerlines through the pair of guide pin grooves corresponds to a spacing between the guide pins of a MT-type ferrule connector.

6. The sub-assembly of claim 1, wherein a centerline through each optical fiber received in the grooves aligns with a centerline of the guide pins.

7. The sub-assembly of claim 1, wherein a centerline through each optical fiber received in the grooves is offset from a centerline of the guide pins.

8. The sub-assembly of claim 1, further comprising an over-mold encapsulating the sub-assembly to form a ferrule connector.

9. An interposer comprising:
    a sub-assembly comprising:
        a substrate comprising a first surface, a second surface, and a front face;
        a pair of guide pin grooves on the first surface of said substrate, wherein the pair of guide pin grooves is configured to receive guide pins from a ferrule connector;
        a plurality of polymeric, resilient side walls deposited on the first surface to define one or more grooves in which the plurality of resilient side walls defines sides of the grooves and the first surface of the rigid substrate defines a bottom of the grooves, wherein each groove of the grooves is configured for receiving an optical fiber such that the optical fiber contacts the first surface when disposed in the groove; and
    an over-mold encapsulating the sub-assembly to form the interposer.

10. An interposer sub-assembly comprising:
    a substrate comprising a first surface, a second surface, and a front face;
    a pair of guide pin grooves on the first surface of said substrate, wherein the pair of guide pin grooves are configured to receive guide pins from a ferrule connector;
    a plurality of polymeric, resilient side walls deposited on the first surface to define one or more grooves in which the plurality of resilient side walls defines sides of the grooves and the first surface of the rigid substrate defines a bottom of the grooves, wherein each groove of the grooves is configured for receiving an optical fiber such that the optical fiber contacts the first surface when disposed in the groove; and
    a lens plate located on the front face of the substrate, wherein the lens plate comprises a plurality of lenses arranged to form a lens array, wherein the lenses are fabricated on a glass surface, and wherein the lenses are aligned with one or more optical fibers disposed in the grooves.

11. A sub-assembly comprising:
a substrate comprising a first surface, a second surface, and a front face, said substrate comprising a rigid material;
a plurality of polymeric, resilient side walls deposited on the first surface to define grooves in which the plurality of resilient side walls defines sides of the grooves and the first surface of the rigid substrate defines a bottom of the grooves, wherein each groove of the grooves is configured for receiving an optical fiber such that the optical fiber contacts the first surface when disposed in the groove;
optical fibers disposed in the grooves; and
a plate located on the front face of the substrate, wherein the plate comprises a plurality of lenses arranged to form a lens array, wherein the lenses are fabricated on the plate, and wherein the lenses align with the fibers disposed the grooves.

12. A sub-assembly comprising
a substrate comprising a first surface, a second surface, and a front face, said substrate comprising a rigid material;
a plurality of polymeric, resilient side walls deposited on the first surface to define one or more grooves in which the plurality of resilient side walls defines sides of the grooves and the first surface of the rigid substrate defines a bottom of the grooves, wherein each groove of the grooves is configured for receiving an optical fiber such that the optical fiber contacts the first surface when disposed in the groove;
at least one optical fiber disposed in the grooves; and
a glass cover positioned on top of the optical fiber, wherein the glass cover urges the optical fiber against said first surface.

13. The sub-assembly of claim 12, wherein each groove is configured to receive an optical fiber having an outer-diameter of about 125 microns.

14. The sub-assembly of claim 12, wherein each groove is configured to receive an optical fiber having an outer-diameter of about 80 microns.

* * * * *